US008208736B2

(12) United States Patent  
Meyer et al.

(10) Patent No.: US 8,208,736 B2
(45) Date of Patent: Jun. 26, 2012

(54) METHOD AND SYSTEM FOR ADAPTIVE RECOGNITION OF DISTORTED TEXT IN COMPUTER IMAGES

(75) Inventors: Hans Christian Meyer, Oslo (NO); Mats Stefan Carlin, Gjettum (NO); Knut Tharald Fosseide, Trollåsen (NO)

(73) Assignee: Lumex AS, Oslo (NO)

( * ) Notice: Subject to any disclaimer, the term of this patent is extended or adjusted under 35 U.S.C. 154(b) by 1075 days.

(21) Appl. No.: 11/908,750

(22) PCT Filed: Mar. 13, 2006

(86) PCT No.: PCT/NO2006/000092  
§ 371 (c)(1),  
(2), (4) Date: Dec. 14, 2007

(87) PCT Pub. No.: WO2006/098632  
PCT Pub. Date: Sep. 21, 2006

(65) Prior Publication Data  
US 2008/0144977 A1  Jun. 19, 2008

(30) Foreign Application Priority Data  
Mar. 17, 2005  (NO) .................................. 20051412

(51) Int. Cl.  
*G06K 9/72* (2006.01)  
*G06K 9/62* (2006.01)  
(52) U.S. Cl. ........................................ 382/229; 382/209  
(58) Field of Classification Search ........................ None  
See application file for complete search history.

(56) References Cited

U.S. PATENT DOCUMENTS

| 4,499,596 | A | * | 2/1985 | Casey et al. | 382/159 |
| 4,975,975 | A | * | 12/1990 | Filipski | 382/227 |
| 5,917,941 | A | | 6/1999 | Webb et al. | |
| 5,966,460 | A | * | 10/1999 | Porter et al. | 382/159 |
| 5,970,170 | A | | 10/1999 | Kadashevich et al. | |
| 6,028,970 | A | | 2/2000 | DiPiazza et al. | |

(Continued)

FOREIGN PATENT DOCUMENTS  
EP  0482427 A2  4/1992

OTHER PUBLICATIONS

Edwards et al. (Dec. 2004) "Making Latin manuscripts searchable using gHMM's." Proc. 2004 Conf. on Neural Information Processing Systems.*

(Continued)

*Primary Examiner* — Bhavesh Mehta  
*Assistant Examiner* — Barry Drennan  
(74) *Attorney, Agent, or Firm* — Volpe and Koenig, P.C.

(57) ABSTRACT

A method and system for recognizing text in computer images comprising distorted text provides an adaptive iterative process wherein recognition rules are adapted, added or omitted based on the present state of the recognition process. When the first pass through the recognition and adaptation is completed, the remaining unrecognized words (15) are passed through the recognition system 1 using the modified set of recognition rules stored in (18) and the process is repeated. In most cases the recognition system 1 will identify further reliable recognized words, which iteratively can be used to improve the recognition rules until the true text comprised in image (10) is recognized throughout the whole text. The steps of the method according to the present invention are thus repeated until convergence.

34 Claims, 3 Drawing Sheets

U.S. PATENT DOCUMENTS

| | | | |
|---|---|---|---|
| 7,031,519 B2* | 4/2006 | Elmenhurst | 382/181 |
| 7,480,411 B1* | 1/2009 | Tzadok et al. | 382/182 |
| 2002/0150295 A1* | 10/2002 | Kwok et al. | 382/186 |
| 2006/0005017 A1 | 1/2006 | Black et al. | |

OTHER PUBLICATIONS

Edwards et al. (Dec. 2005) "Searching for character models." Proc. 2005 Conf. on Neural Information Processing Systems.*

Kopec et al. (Feb. 1996) "Document-specific character template estimation." Proc. SPIE vol. 2660, pp. 14-26.*

Lavrenko et al. (Aug. 2004) "Holistic word recognition for handwritten historical documents." Proc. 1st Int'l Workshop on Document Image Analysis for Libraries, pp. 278-287.*

LeCun et al. (Nov. 1998) "Gradient-based learning applied to document recognition." Proc. IEEE, vol. 86 No. 11, pp. 2278-2324.*

Nagy et al. (Apr. 1966) "Self-corrective character recognition system." IEEE Trans. on Information Theory, vol. IT-12 No. 2, pp. 215-222.*

Xiu et al. (Aug. 2010) "Incorporating linguistic model adaptation into whole-book recognition." Proc. 20$^{th}$ Int'l Conf. on Pattern Recognition.*

Xu et al. (Dec. 1999) "Prototype extraction and adaptive OCR." IEEE Trans. on Pattern Analysis and Machine Intelligence, vol. 21 No. 12, pp. 1280-1296.*

George Nagy et al. "Optical Character Recognition—An Illustrated Guide to the Frontier" Kluwer Academic Publishers 1999.

Ho et al., "OCR with No Shape Training" Issue Date: 2000 (6 pages).

Myers et al., "Recognition of Text in 3-D Scene" Copyright 2001 (17 pages).

* cited by examiner

METHOD AND SYSTEM FOR ADAPTIVE RECOGNITION OF DISTORTED TEXT IN COMPUTER IMAGES

The present invention is related to a method and system for recognizing text in computer images in a computer system, and specially to a method and system for adapting rules used for the text recognition based on an adaptive iterative adjustment of recognition rules, related parameters, omitting or adding of further rules based on the text that is current being processed in the iteration process, according to the attached independent claims 1 and 18, and dependent claims 2 to 17 and 19 to 35.

The present state-of-the art text recognition systems, often denoted as Optical Character Recognition Systems, are typically based on template matching with known fixed templates, by structural matching or by recognizing the characters based on a set of fixed set of recognition rules using a set of computed features extracted from the shapes of characters. Each character will be assigned a score or an a priori calculated is probability for each character class or set A dictionary is used to check that each chain of proposed characters can form words, picking the most probable word.

The state-of-the art text recognition systems usually fails when they encounter moderate to heavily distorted text images. Such degrading of text images may be a result of photocopying an original document, typewritten documents which may be encountered when scanning older archive material, newspapers which usually have poor print and paper quality effecting the quality of the text images, faxes which usually has poor resolution in the transmission channel and printing device, etc. These and similar problems are described in the book by Stephen Rice et al, "Optical Character recognition—An illustrated Guide to the Frontier", Kluwer Academic Publishers 1999.

The current text recognition systems do only to a limited extent adapt to specific font or deformation of the text without a guided learning phase requiring human interaction in the process, which slows down the process considerably. Electronic document handling, archive systems, electronic storage of printed material etc. requires scanning of unlimited number of pages which makes it impossible to use human interaction to succeed with such tasks.

An example of guided learning is disclosed in U.S. Pat. No. 5,917,941 dated Jun. 29, 1999 disclosing a method and system for recognizing handwritten text based on recognizing some characters and providing a user interface presenting a limited list of probable words comprising the character each time a character has been identified, and then let the user select the most probable words used in the text. Based on these manual user selections, the recognition process continues.

An example of an automated adaptive recognition system is disclosed in EP 0 482 427 A2 providing a neural network performing hierarchical pattern recognition. However, the adaptation is only related to a specific geometrical feature of the text to be recognized, namely gray scale parameters. The neural network according to this invention can use the grey scale parameter to extract fairly complex features of input patterns, including translations, rotation and scaling of input patterns. However, an inherent aspect of neural networks is that they are trained with specific examples of a parameter variation, as grey scale in this example, and therefore it is impossible to adapt the grey scale rule as such in this embodiment, for example to modify the grey scale levels to two levels, such as white and black, which may be a parameter selected by a user using a flatbed scanner without training the specific network for this special case. In such cases, threshold levels and adjustments of thresholds as known to a person skilled in the art may provide an easier and better adaptation to the actual features of the document to be recognized. To be able to cope with the different aspects of the recognition process, an OCR system needs not only one algorithm, but a plurality of algorithms or strategies to choose from to be able to adapt to the realities of the document at hand. However, even when there is a plurality of algorithms at hand, each algorithm may also pass through some sort of tuning to provide the best achievable results in the OCR process. Therefore, preprogrammed solutions, even when trained on actual cases as with neural networks, do not provide an optimal solution to the OCR problem as such when the text images are distorted.

U.S. Pat. No. 6,028,970 disclose a method and apparatus for enhancing optical character recognition comprising a data processor and memory for maintaining an error detection and correction log. The data processor maintains a memory table of a plurality of rules for generating a rule base determined by recognition of a particular context type of an electronic bit-map portion. The appropriate rule base comprises rules and combinations of rules for application to bit-map portion data. A rule, a rule base or data may be selected and obtain from an internal or external memory. Upon application of the rule base, the error detection and correction log maintains a record of clear errors, corrected data, failed rules of the rule base and the original bit-map. Possible errors are flagged and clear errors are automatically corrected provided a confidence level in the correction is reached or exceeded. Through recognition of patterns of errors in the error detection and correction log, new rules may be generated for storage in the rule memory table. This scheme also allows implementing a learning phase of the rules base.

The teaching of this publication does not disclose what happens if there is many errors in the recognition process. For example, if only ten percent of a document is recognized correct, a 90% of the document is dubiously recognized this scheme have probably some problems of obtaining a set of rules that will solve the recognition problem. If the error rate is high, and the rules are updated according to the errors, and still provides an error when used, it is most probable that the error will continue to exist according to this teaching. However, is the number of errors are small in the error log, the teaching of this pattern may provide a solution to the recognition problem.

An aspect of the present invention is to provide a method and system that can cope with heavily distorted images of text.

Therefore, there is a need for a method and system that provide more reliable automatic text recognition when the text is distorted. According to the present invention this is achieved by first using at least one a priori known rule to recognize unknown characters, and then some words or parts of words by using the at least one rule for unknown characters, for example by dictionary lookup. By using those words or parts of words that are reliable recognized, the recognition of further words or parts may be provided by for example adding at least one other rule, by adapting the at least one initial recognition rule, by adjusting parameters used in established rules, omit established rules or add further rules based on the preliminary recognized words or parts of words, or characters, and then iteratively continue the recognition process of the rest of the text while at the same time updating, adapting, adding and/or removing a selection of recognition rules used in the succeeding iterative steps of the process, and stopping the process when a defined amount of the text has been reliable recognized.

Figure 1:
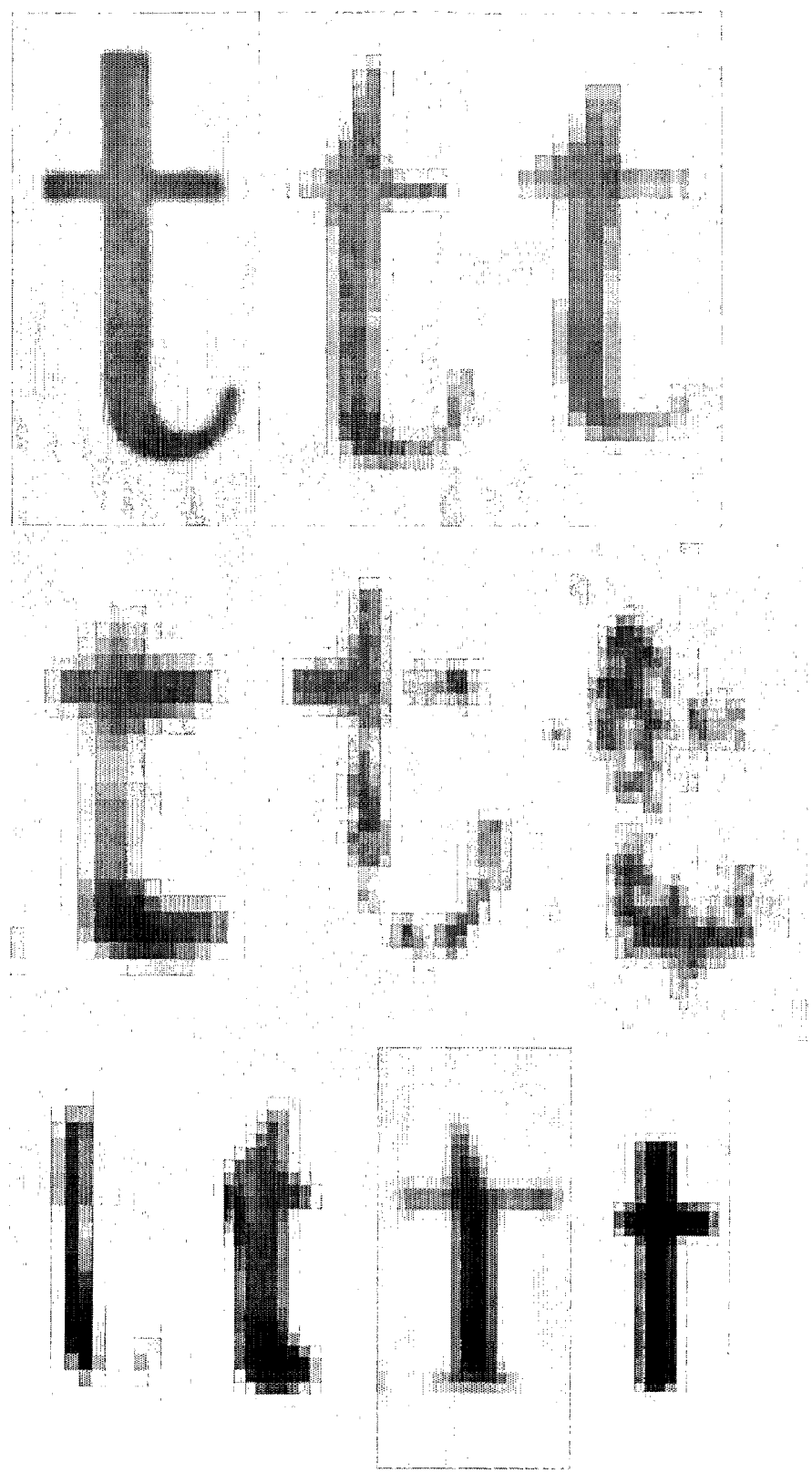
FIG. 1 illustrates examples of distorted images of the letter t.

FIG. 1 illustrates the problem sometimes encountered when trying to recognize text in distorted images. The human brain is often able to extract which features related to for example the letter 't' as illustrated in FIG. 1 that identifies or distinguishes this letter from other letter shapes. However, to provide an algorithmic description of such a human process seems to be difficult. The basis for automated machine based recognition, such as OCR systems, is based on computing or extracting some features from the provided image of the text related to characters in the text, and comparing these features with similar features computed beforehand for specific letters. If the features extracted or computed from the provided image of the text is equal with the corresponding features computed for a specific letter, the probability that this character in the image is this letter is by default 1.

This situation is the ideal situation for OCR. However, any moderate to heavy distortion of the image comprising the text may alter the appearance of letters in the text such that is the probability for being for example the letter 't' as described above may be diminished considerably. The first image of the letter 't' in the upper left corner of FIG. 1 is simple to recognize, while the rest of the distorted images will provide different probabilities for being the letter 't'. Another aspect regarding character recognition is that characters belong to different fonts or typefaces.

Figure 2:
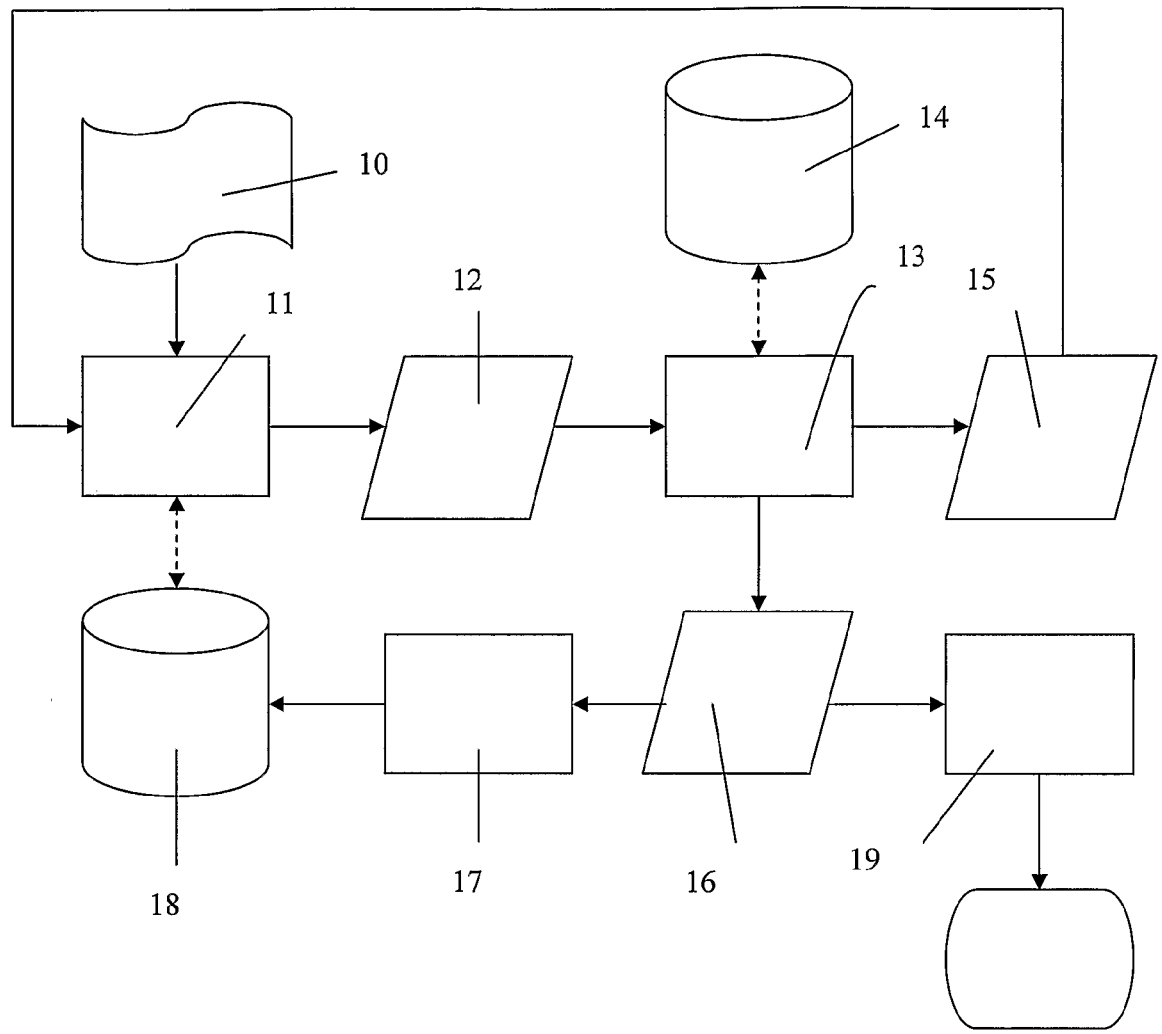
FIG. 2 depicts a flow diagram of an example of embodiment of the present invention.

However, according to a preferred example of embodiment of the present invention, as depicted in FIG. 2, it is possible to apply an adaptive iterative approach to the text recognition problem of distorted images. In FIG. 2 the original text image 10 is communicated to the text recognition process 11, such as found in OCR programs in a computer (not shown). According to this preferred example of embodiment, the text recognition system 1 includes a scheme comprising at least one recognition rule that is applied on the communicated image 10. This at least one rule may be available in a computer storage 18 communicating with the recognition process 11. For example, the output of the recognition process 11 may be a score value 12 for characters encountered in the image 10. These score values may be used in a dictionary look up table 13. The dictionary lookup table communicates with computer storage 14 comprising statistics such as character frequency tables as known to a person skilled in the art. The dictionary lookup process 13 provides one of two possible output streams: a) reliable recognized words 16, or b) dubious recognized words 15. A reliable recognized word may be a word comprising characters with a score value exceeding a predefined level. In another embodiment of the present invention at least two recognition rules are tested in the recognition process 11, and the result of the one of the at least two rules providing higher probability of being a certain word or part of words is selected as the reliable word or part of words. The dubious recognized items are processed again in the recognition process 11 while at the same time, the reliable recognized words are processed to adapt rules in a rule adaptation process 17. The adaptation process 17 may comprise adapting the recognition rules to a specific font type or a specific identified geometrical feature that is related for example to a specific deformation of the text. The result of the rule adaptation process 17 is communicated to the storage 18 providing an updating of the rules used in the recognition process 11.

When recognizing documents with text of low quality comprising unknown fonts, it is possible to analyze the actual properties of the original font in the document and the distortion the characters have been through, for example due to the printing or typing process of the document, or due to aging, as known to a person skilled in the art, in an automatic analysis program, for example in a computer system. The parameters obtained this way regarding characters in the document may then be used to automatically configure an initial recognition run in an OCR system. However, the result of the initial OCR process is that not all characters are identified to a certain degree of robustness. Some characters may be viewed as having alternative representations, for example the characters "i", "j" and "l" may easily be mixed when distorted. One way of handling all the possible alternatives is by character classification. Character classification is a method where images of individual characters of unknown type are classified using a classifier that decides which character class the unknown character probably belong to using quantitative information of one or more characteristics inherent in the character. One example of a classification technique is clustering. Clustering is based on partitioning of a data set into subsets (clusters), so that the data in each subset share some common trait.

Usually, the OCR system may exclude many character classes in the initial run, and only leave a limited number of competing character classes. A word list, dictionary, cue words (cribs), statistics or pattern analysis may further be utilized to identify words or parts of words that may be assumed to be correct.

For example, according to an example of embodiment of the present invention, the words {'documents', 'characters', 'initial', 'incapable', 'of', and 'range'} have been recognized as outlined above initially, and for example has been identified in a dictionary. This provides a result comprising at least one instance of the characters 'acdefghilmnoprstu' that are probably correct, and at least two instances of the characters 'aceilnorst'. The multiple instances of the same character class provides a basis for verifying that they are similar based on, for example, direct character grey-level or bit-map image matching. After verification, the original recognition scheme may be improved by adapting the initial rule(s) by fitting the rules to the actual identified character classes. For example, the fitting or adaptation of the rule(s) may be done by adding new rules related to for example geometrical features (for example strokes), removing rules from the scheme, or changing weight or range of rules.

After the adaptation of the rule(s) has been performed, the OCR process may continue in an iteratively manner, by running the OCR process once more thereby producing more probable recognized words based on the adapted rule(s), since there is a smaller remaining set of competing character classes after the adaptation. For example, assume the words {'quality', 'unknown', 'font', 'through', 'recognition', 'system', 'dictionary', and 'typical'} are identified in addition to the words listed above. The new words leads to more multiple instances of characters, which further leads to the possibilities of adapting rules even more, and then iteratively continue the OCR process. In this example, the new words leads to at least one instance of the characters 'acdefghiklmnopqrstuwy', and at least two instances of the characters 'acdefghilmnoprstuy', that are recognized properly.

It is important to understand that this adaptation of the initial rule(s) related to unknown character classes comprised in the initial scheme is adapted according the actual encountered characters in the actual text processed in the OCR system in an automatic manner, without any human interception in the iterative process according to the present invention. Therefore, unlike any known prior art solution, parameters like weighting, threshold limits etc., are all adjusted according to how the actual document has been distorted. Therefore, the actual recognition according to this aspect of the present invention performs the recognition not based on a model related to fonts, type of distortion (such as bending of a sheet (cylinder model)), etc., but on how the text images actually appears.

Therefore, it is important to understand that unlike any other prior art solutions that try to cope with distorted text, or handwritten text etc., by providing models or steps directed towards identifying types of distortions, the present invention merely iteratively adapts to the actual distortions encountered in the documents, if there are distortions present. Therefore, if there are no distortions present, the method and system according to the present invention iteratively adapts to the conditions of the non-distorted image.

According to another aspect of the present invention, it is also possible to resolve conflicts related to quasi-unique words. For example, the word 'foot' may easily be misclassified as 'feet when an image comprising this word is distorted. Assume that the words 'floor' and 'of' is also present in the text. Since words like 'fleer' and 'ef' is not found in a dictionary, it is more probable that the word is 'foot'.

According to another aspect of the present invention, a dictionary or word list is only one of several methods for verification that maybe used in the context of the present invention. For example:
- Language specific unilateral frequency distributions,
- Vowel-consonant relationships (vowels are more likely to neighbour many character classes),
- Positional frequency distributions,
- Common digraphs (two-letter combinations) and trigraphs (three-letter combinations),
- Cipher patterns (unique patterns of repeated positions of letters in a word),
- Common short words and cribs (unique words that we expect to find in any text), are examples of techniques that may be used single handed or in combinations for verification purposes, including tuning of respective parameters providing adjustments of performance of the respective techniques during the iterative process, according to the present invention.

Figure 3A:
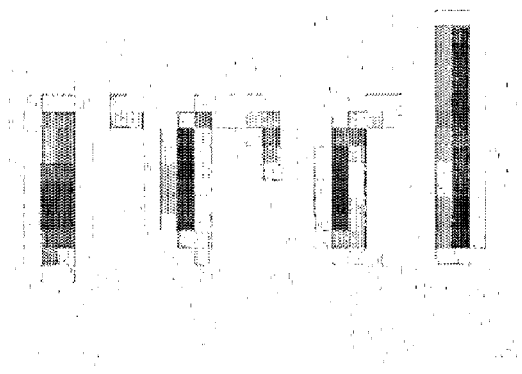
FIGS. 3a and 3b illustrates an example of adaptation of a grey scale recognition rule.
Figure 3A:
Figure 3B:
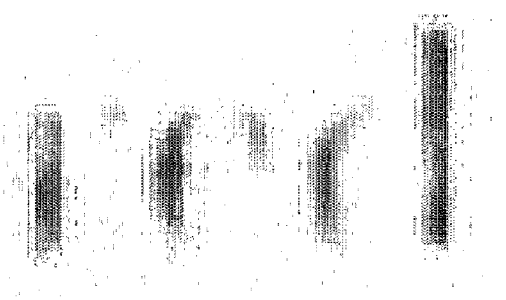
Figure 3B:

Geometrical features identified and used in the adaptation process 17, according to the present invention includes also aspects such as grey scale, pixel count, and pixel density etc. In FIG. 3a, the word red is depicted with a certain resolution to the left in the figure. To the right is illustrated how a shape is typically identified according to the grey scale image. As can be seen, the shape of the word is hard to identify because of the resolution provided in the grey scale image of the word. In FIG. 3b the grey scale is adapted by providing an interpolation of the grey scale in additional pixels constituting the image of the word red. On the right hand side of FIG. 3b it is illustrated how this enhanced resolution simplifies the identification of the word by providing a better shape of the characters in the word.

Another embodiment of the present invention comprise creating a word list or dictionary lookup table based on the adaptation of the rules, for example by adding words to the dictionary lookup process 13 depicted in FIG. 2.

When the first pass through the recognition and adaptation is completed, the remaining unrecognized items 15 are passed through the recognition system 1 using the modified set of recognition rules stored in 18 and the process is repeated as described above. In most cases the recognition system 1 will identify further reliable recognized words, which iteratively can be used to improve the recognition rules until the true text comprised in image 10 is recognized throughout the whole text. The steps of the method according to the present invention are thus repeated until convergence.

The criteria for determining that the process has achieved convergence may vary in different embodiments. For example, when the recognition process II has recognized a certain amount of the text in the provided image 10, such as for example 90%, the recognition process 11 terminates in the present example of preferred embodiment. The recognition system 1 continues processing the recognized text by organizing the text in the organizing process 19. For example, the organizing process 19 may assign specific words to remaining dubious recognized words 15. The assignment may be based on the result from the character score process 12 and the dictionary process 13 providing the most probable word related to the dubious word under present investigation in the organizing process 19.

Another example of convergence criteria may be that the number of reliable recognized words in the output stream a) from the dictionary lookup process 13 is not increasing from iteration to the next. When this is event is identified in the recognition system 1, the process continues with the organizing process 19 as described above.

Generally stated, the convergence criteria according to the present invention may be one of following examples:
1. All characters are completely recognized.
2. All characters are partially recognized. Remaining partially recognized characters are considered to be within groups of predefined character confusion alternatives (examples are 'oce', '11!I', 'O0Ø', '5S$') that have similar geometric features.
3. The list of features to test is exhausted.
4. Remaining characters are considered to be part of the image and not text based on low recognition results for any set of rules considered through the process or based on a specific non-character filter.
5. A timer is used to limit the processing time.
6. The recognition rate reaches a predefined level (this approach is only used in certain applications where the recognition rate is less critical and only in combination with a two-step timer with a minimum and maximum processing time).

Another example of embodiment of the present invention provides also a labeling of such assigned words for dubious recognized words, by for example highlighting the words in the final recognized text.

Another embodiment of the present invention includes deciding that the dubious recognized word is garbage and excluding the word from the recognition result if no satisfactory interpretation is found, or if geometrical considerations indicate that the dubious recognized word is indeed garbage. Examples may be scribble in a margin or graphics in an image that has been mistaken for being a real word.

Another example of embodiment of the present invention provides recognition rules based on a word list as known to a person skilled in the art.

Another example of embodiment of the present invention traces variations of specific identified characters, providing this as recognition rules. For example, the recognized character can also be used to identify the existence, curvature and length of the bottom bow stroke of for example the letter 't', the position and shape of the cross stroke of the letter 't' or the typical fragmentation pattern of the stem stroke of the letter 't' in vertically fragmented text. The letter 't' is quite common in normal texts and will most likely occur among the set of reliable recognized characters. All these parameters are vital for recognizing the letter 't'. In the present example of embodiment, these parameters are adapted in the rule adaptation process 17 to correspond with the specific appearance of these features in the provided text image 10. However, if the adaptation of a rule leads to for example that score values 12 never exceeds a predefined threshold level after some iterations, an example of embodiment of the present invention omits the recognition rule by removing or marking the rule as lapsed in the storage 18. As an alternative, parameters associated with the lapsed rules may be adjusted or restored to provide a feasible recognition rule again.

Another example of embodiment of the present invention may adapt the general rules or common rules valid for several character classes based on the occurrence of a feature or rule in a single reliable recognized character class. As an example any rule concerning the dot over the letter 'i' is also valid for the dot over the letter 'j'.

Another example of embodiment of the present invention may remove a general rule for a character class or a set of characters classes, such as removing rules related to the bottom right serif of the letter 'a' when we encounter the version without serif as in 'a'.

Another embodiment of the present invention comprises a computer program executing the method according to the invention outlined above, wherein the original text image 10 is provided by an attached scanner device or another electronic image acquisition device (such as a digital camera) in communication with the computer system running the computer program. Dictionary or character frequency tables 14 and set of rules 18 are organized as database records in this example of embodiment.

The invention claimed is:

1. A method for recognizing distorted text in a computer image of the text, wherein the method uses at least one a priori defined recognition scheme for recognizing unknown characters, the method comprising the steps of:
   a) using the a priori defined recognition scheme, and identifying at least one recognition rule in the recognition scheme that provides appropriate recognition of words or partial words,
   b) using the identified at least one recognition rule on the computer image of the text to provide a first output stream including reliable recognized words and a second output stream including dubious recognized words,
   c) identifying at least one geometrical feature in the distorted text image related to actual characters encountered in the first output stream, and establishing at least one additional recognition rule in the recognition scheme based on the at least one geometrical feature,
   d) whenever there is a second output stream, providing an adaptation of rules in steps a), b) and c) before continuing recognizing words, and
   e) iteratively performing steps a), b), c) and d), until a predefined stop criteria is reached.

2. The method according to claim 1, wherein step a) includes checking an a priori probability for a set of identified features of a chain of characters or character classes in the provided distorted text by dictionary lookup for recognizing the words or parts of the words.

3. The method according to claim 1, wherein step a) includes template matching based on a template library included in the recognition scheme for recognizing the words or parts of the words.

4. The method according to claim 1, wherein step a) includes using character statistics in combination with a dictionary for recognizing the words or parts of the words.

5. The method according to claim 1, wherein step a) includes using a word list for recognizing the words or parts of the words.

6. The method according to claim 1, wherein a result of recognized words or parts of words from step a) is used to create a word list in the recognition scheme.

7. The method according to claim 1, wherein a result of recognized words or parts of words from step a) is used to create a dictionary look up table in the recognition scheme.

8. The method according to claim 1, wherein step a) includes using at least two parts of the recognition scheme and selecting the result of the part providing a higher reliable recognition of the words or parts of the words.

9. The method according to claim 1, wherein step c) includes using a smaller set of structural features identifying the geometrical feature.

10. The method according to claim 1, wherein step d) includes deleting an identified rule in the recognition scheme if the identified rule provides reduced recognition.

11. The method according to claim 1, wherein the adapted rules in step d) includes adjusting a probability parameter, a score value parameter, or a weight value parameter, used in recognition rules in the recognition scheme.

12. The method according to claim 11, wherein the adapted rules in step d) are used to establish a further additional appropriate recognition rule in the recognition scheme.

13. The method according to claim 1, wherein step d) includes using the recognized words in step a) to adapt the recognition rules in the recognition scheme.

14. The method according to claim 1, wherein step e) further includes handling remaining dubious recognized words by assigning the dubious recognized words to be equal with corresponding words found as being a candidate with a highest probability as being the word after the iterative process is finished.

15. The method according to claim 14, wherein the assigning includes labeling the assigned words as assigned words.

16. The method according to claim 1, wherein the at least one geometrical feature in step c) includes a grey scale of the distorted text.

17. The method according to claim 16, wherein the adaptation in step d) includes increasing a number of pixels of the at least one geometrical feature by grey scale interpolating the increased number of pixels.

18. A computer system for recognizing distorted text in a computer image of the text, wherein the computer system is configured to:
   use at least one a priori defined recognition scheme for recognizing unknown characters;
   identify at least one recognition rule in the recognition scheme that provides appropriate recognition of words or partial words;
   provide a first output stream including reliable recognized words and a second output stream including dubious recognized words using the identified at least one recognition rule on the computer image of the text;
   identify at least one geometrical feature in the distorted text image related to actual characters encountered in the first output stream;
   establish at least one additional recognition rule in the recognition scheme based on the at least one geometrical feature;

provide an adaptation of the identified at least one recognition rule before continuing recognizing words whenever there is a second output stream; and iteratively performing the identified at least one recognition rule until a predefined stop criteria is reached.

19. The computer system according to claim 18, wherein the computer system is further configured to:

check an a priori probability for a set of identified features of a chain of characters or character classes in the provided distorted text by dictionary lookup for recognizing the words or parts of the words.

20. The computer system according to claim 18, wherein the computer system is further configured to:

perform template matching based on a template library included in the recognition scheme for recognizing the words or parts of the words.

21. The computer system according to claim 18, wherein the computer system is further configured to:

use character statistics in combination with a dictionary for recognizing the words or parts of the words.

22. The computer system according to claim 18, wherein the computer system is further configured to:

use a word list for recognizing the words or parts of the words.

23. The computer system according to claim 18, wherein the computer system is further configured to:

create a word list in the recognition scheme using a result of recognized words or parts of words.

24. The computer system according to claim 18, wherein the computer system is further configured to:

create a dictionary look up table in the recognition scheme using a result of recognized words or parts of words.

25. The computer system according to claim 18, wherein the computer system is further configured to:

use at least two parts of the recognition scheme and select the result of the part providing a higher reliable recognition of the words or parts of the words.

26. The computer system according to claim 18, wherein the computer system is further configured to:

use a smaller set of structural features identifying the geometrical feature.

27. The computer system according to claim 18, wherein the computer system is further configured to:

delete an identified rule in the recognition scheme if the identified rule provides reduced recognition.

28. The computer system according to claim 18, wherein the computer system is further configured to:

adjust a probability parameter, or a score value parameter, or a weight value parameter, used in recognition rules in the recognition scheme.

29. The computer system according to claim 28, wherein the computer system is further configured to:

establish a further additional appropriate recognition rule in the recognition scheme using the adapted rules.

30. The computer system according to claim 18, wherein the computer system is further configured to:

use the recognized words to adapt the recognition rules in the recognition scheme.

31. The computer system according to claim 18, wherein the computer system is further configured to:

handle remaining dubious recognized words by assigning the dubious recognized words to be equal with corresponding words found as being a candidate with a highest probability as being the word after the iterative process is finished.

32. The computer system according to claim 31, wherein the computer system is further configured to:

label the assigned words as assigned words.

33. The computer system according to claim 18, wherein the at least one geometrical feature includes a grey scale of the distorted text.

34. The computer system according to claim 33, wherein the computer system is further configured to:

increase a number of pixels of the at least one geometrical feature by grey scale interpolating the increased number of pixels.

* * * * *